Figure 1:
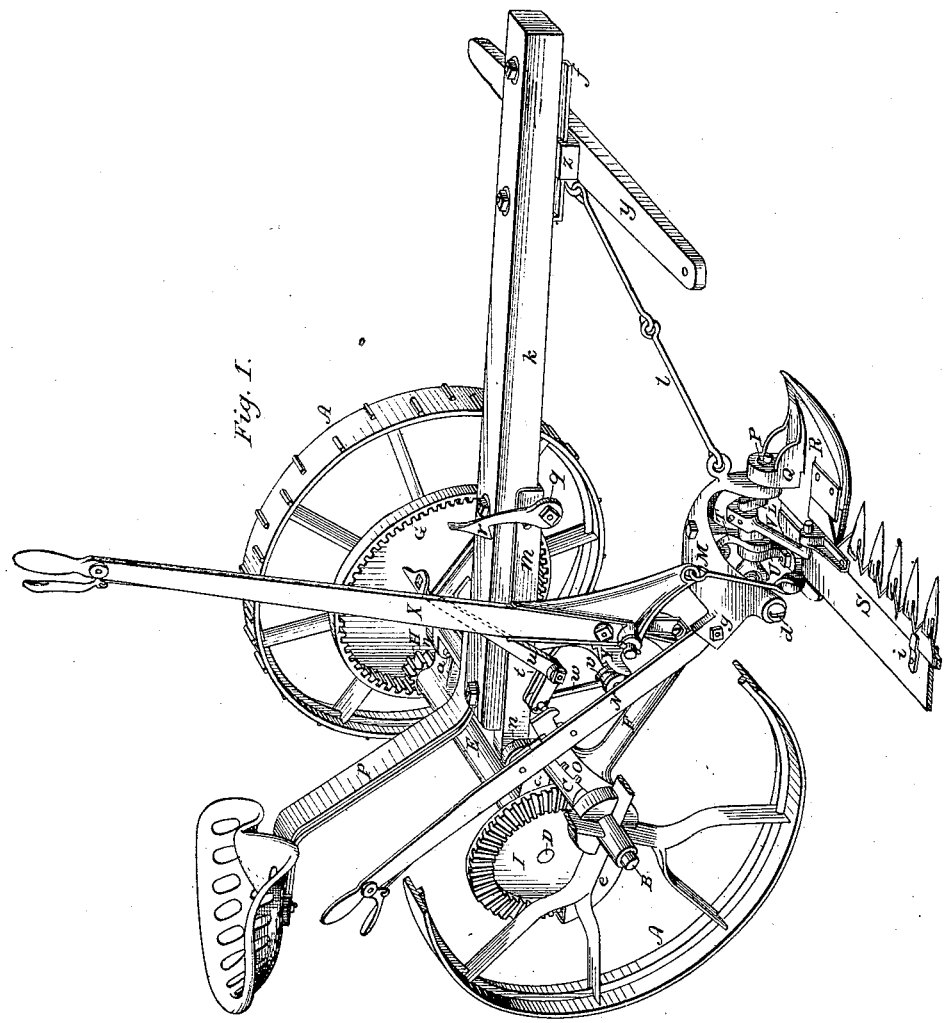

W. N. WHITELEY.
MOWER.

No. 191,016.

6 Sheets—Sheet 1.

Patented May 22, 1877.

Attest:
Clarence Poole
M. B. Smith

Inventor:
W. N. Whiteley
By his Atty
R. W. C. Smith

W. N. WHITELEY.
MOWER.
No. 191,016. Patented May 22, 1877.
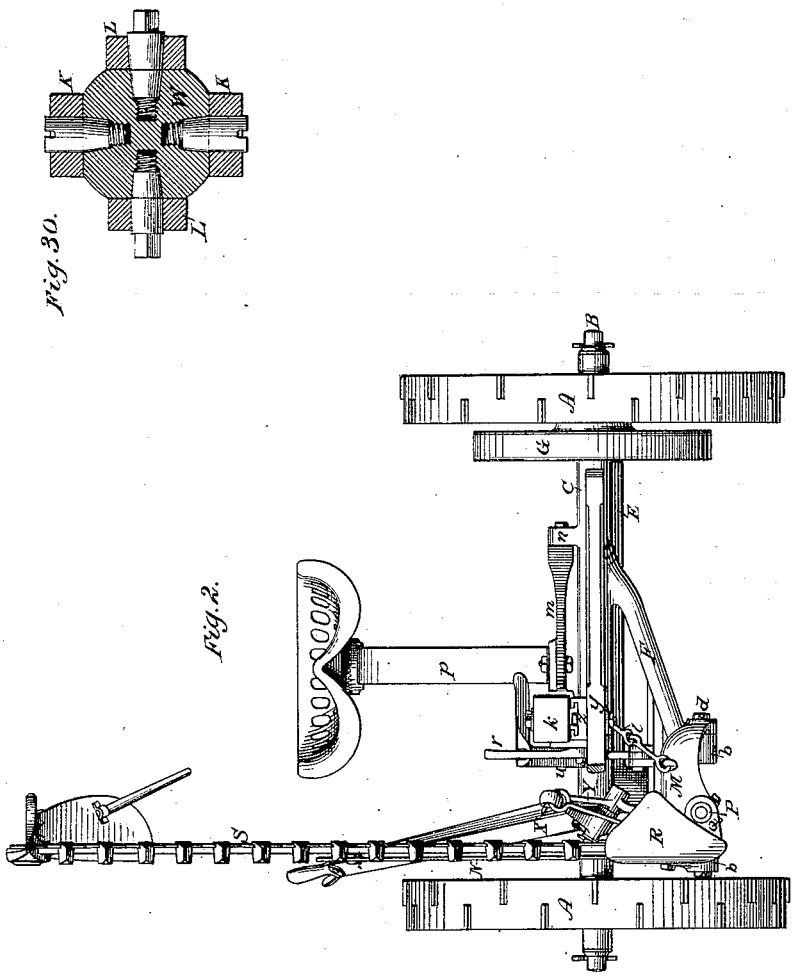

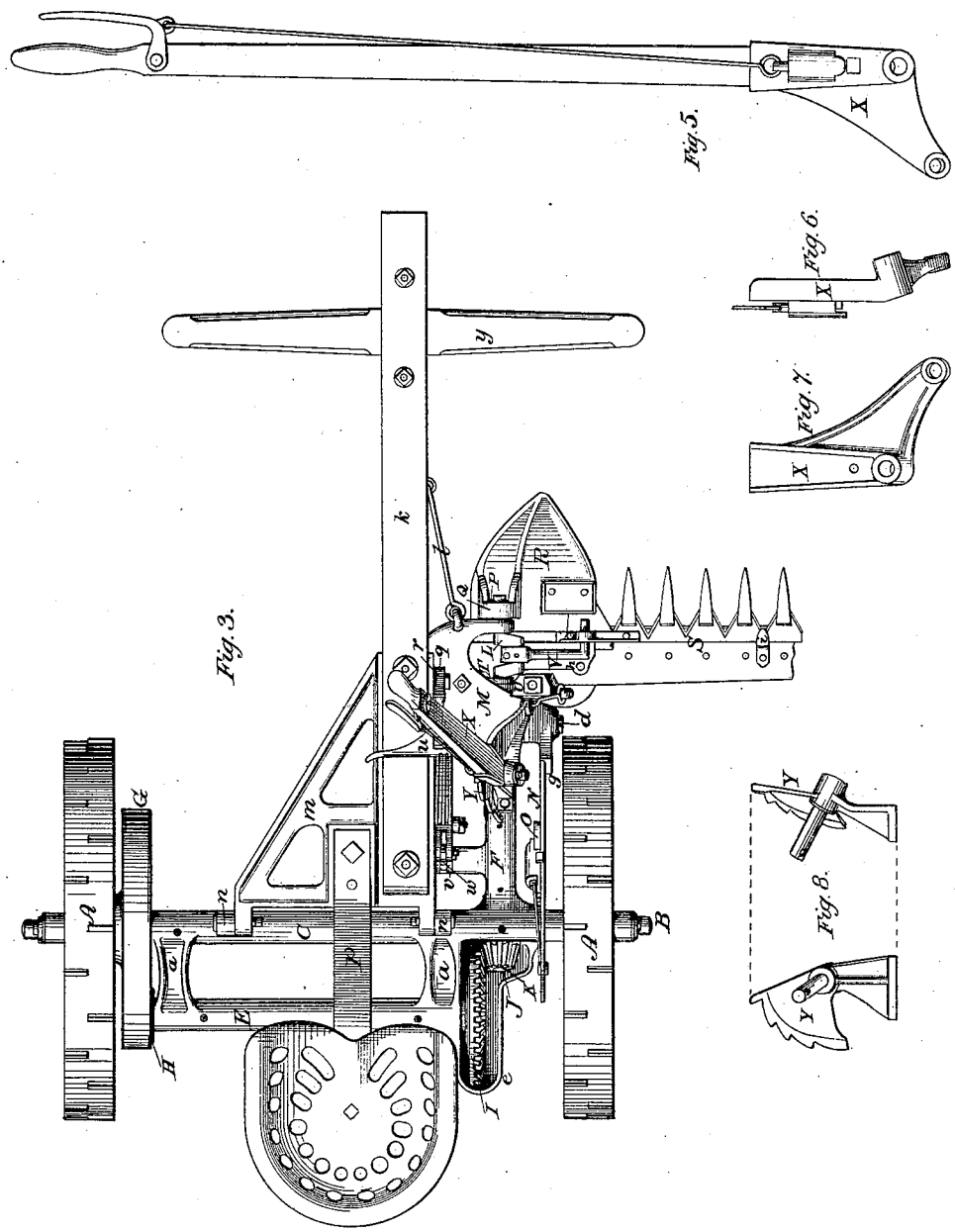

6 Sheets—Sheet 4.
W. N. WHITELEY.
MOWER.
No. 191,016. Patented May 22, 1877.
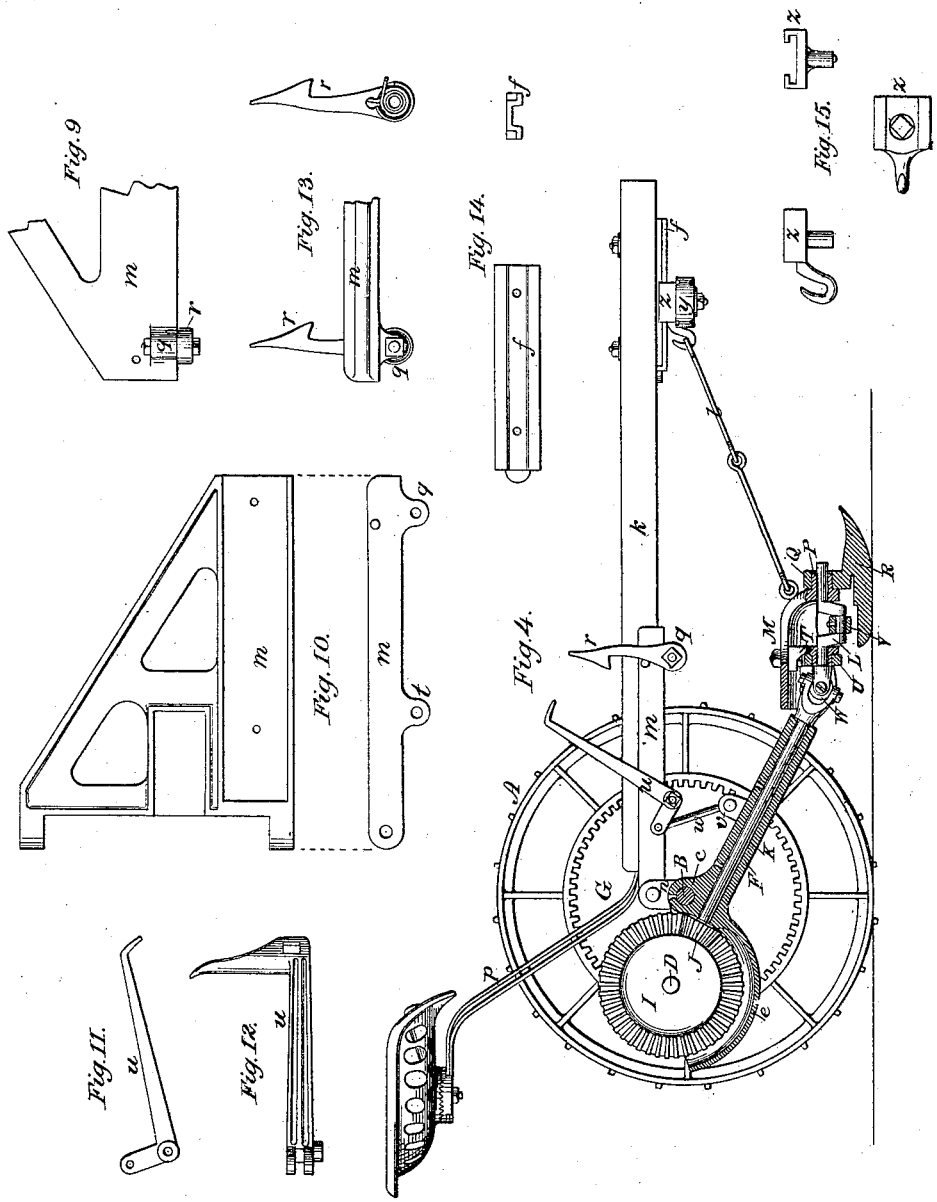
Attest:
C. Clarence Poole
M. B. Smith
Inventor:
W. N. Whiteley
By his Atty
R. D. O. Smith

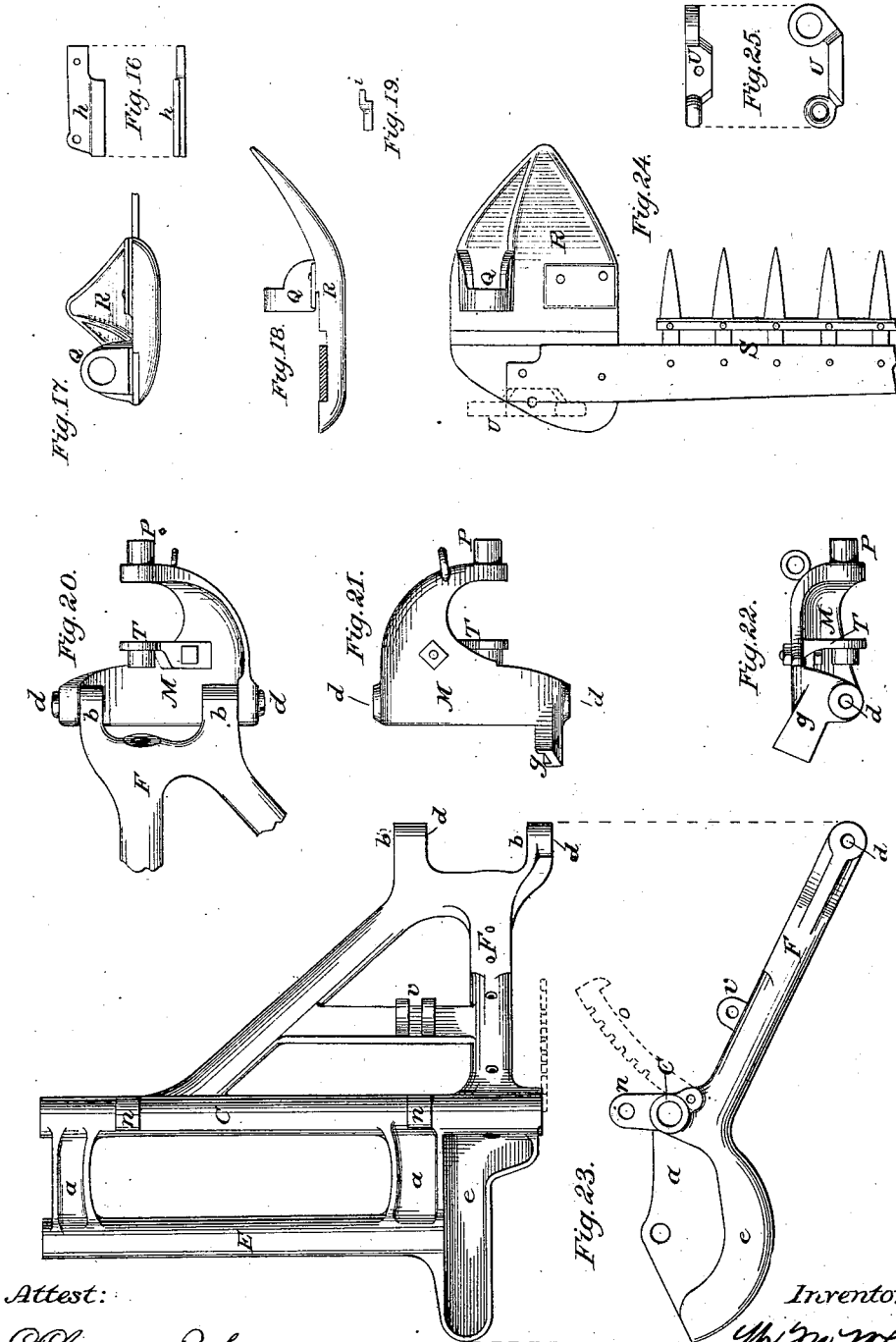
W. N. WHITELEY.
MOWER.
No. 191,016. Patented May 22, 1877.

6 Sheets—Sheet 6.
W. N. WHITELEY.
MOWER.
No. 191,016. Patented May 22, 1877.
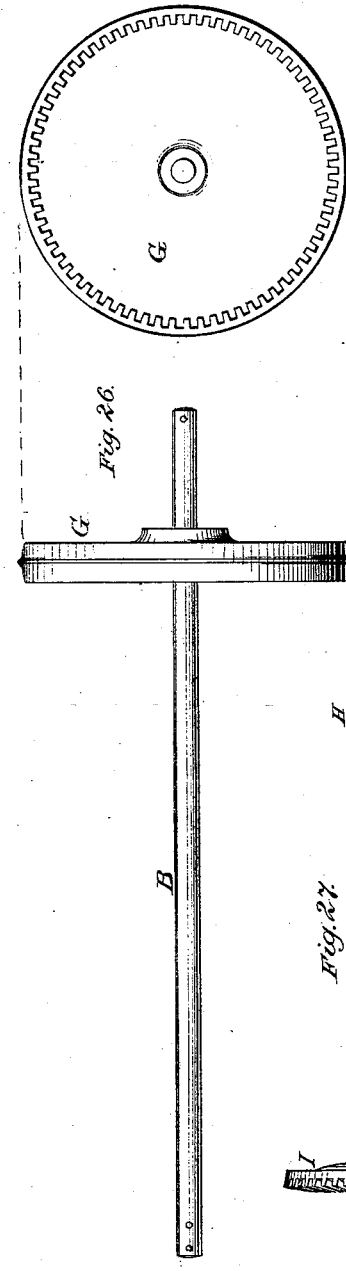
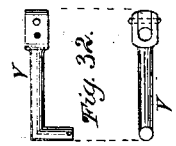
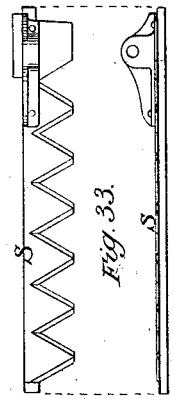
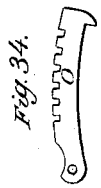
Attest:
Clarence Poole
M. B. Smith
Inventor:
W. N. Whiteley
By his Atty
R. D. O. Smith

UNITED STATES PATENT OFFICE.

WILLIAM N. WHITELEY, OF SPRINGFIELD, OHIO.

IMPROVEMENT IN MOWERS.

Specification forming part of Letters Patent No. 191,016, dated May 22, 1877; application filed March 26, 1877.

*To all whom it may concern:*

Be it known that I, WILLIAM N. WHITELEY, of Springfield, in the county of Clarke and State of Ohio, have invented a new and useful Improvement in Mowing-Machines, of which the following is a full and clear description:

This improvement relates to that class of harvesting-machines known as independent-frame double-jointed machines, whereby the cutting apparatus is enabled, by free longitudinal and lateral adjustments, which may be automatic, to adapt itself to the undulations of the ground over which it is advancing, and may, by means of appropriate levers, be raised from the ground to pass over obstructions or to facilitate transportation from place to place.

The object of this invention is to simplify the structure of machines of this class by decreasing the number of parts and by rendering the parts more easy of construction, more direct in action, and more convenient in arrangement and management.

It therefore consists, first, in an inverted frame or shoe above the ordinary inner shoe, and united thereto on a longitudinal horizontal axis coincident with the axis of a short crank-shaft, the crank whereof is in line with the cutter, and connected therewith by a suitable pitman, and united to an independent vibrating frame, which is pivoted upon the main axle in a transverse horizontal axis, so that said inner shoe and the cutting apparatus attached thereto may be free to move upon either, or simultaneously upon both, of said axes without disturbing the movement of the cutters; second, in the arrangement of driving gear and shafts mounted upon said pivoted independent frame, and connected to the said short crank-shaft by a universal joint located at the intersection of the longitudinal and transverse axes above mentioned; third, in the structure of said vibrating frame, whereby the transverse joint is not continuous, and the universal joint above mentioned can be placed in its line; fourth, in the structure and arrangement of a controlling-lever, whereby the relative position of the vibrating frame and inverted shoe may be adjusted at will; fifth, in the arrangement of means for raising the outer end of the cutting apparatus; sixth, in the arrangement of means for raising and sustaining upon the tongue the entire cutting apparatus.

That others may fully understand my invention, I will more fully describe it, having reference to the accompanying drawings, wherein—

Figure 1 is a perspective of my machine, arranged as a mower. Fig. 2 is a front view of the same. Fig. 3 is a plan view. Fig. 4 is a vertical longitudinal section in the plane of the axis of the cutter's crank-shaft. Figs. 5 to 36 inclusive are views of details detached, which will be fully understood from the general specification and reference-letters without more particular description here.

The main wheels A A are similar to the wheels commonly used on machines of this kind, and are mounted upon and united to the main axle B in any usual manner. The axle B passes through and has its bearings in the vibrating frame C, which is preferably made tubular in order to secure strength and to protect said axle. In rear of said tubular portion of the frame C, and cast with the same, I make bearings for a counter-shaft, D, and prefer to inclose said bearings in a tubular box or sleeve, E, parallel with the frame C, and united to the same by standards or arms *a*.

In front of the tubular portion of the frame C is a triangular frame, F, which projects forward and downward, and supports the cutting apparatus at its front end. The general figure of the portion F is that of a right-angled triangle, the base of which is at the main axle B.

These three portions, C, E, and F, of the frame, I prefer to make of cast-iron, all in one piece, though it is evident they might be separately made and bolted together. That method would be more expensive and less satisfactory on the score of accuracy than the method first mentioned. The frame composed of these three parts, as will be perceived, is pivoted upon the axis of the main axle B, and may vibrate thereon. It is therefore known as, and will hereinafter be alluded to as, the "vibrating frame."

An internal gear-wheel, G, is secured to the main axle B, so as to revolve therewith, and it meshes with the pinion H on the counter-shaft D, to drive the same. The wheel G is made with internal instead of external teeth, for the purpose of protecting the teeth from dirt, and more particularly to bring the pinion H within the diameter of the pitch-line, and thereby decrease the distance between the axle or shafts B and D.

The shaft D has upon the end opposite the pinion H a bevel-wheel, I, which meshes with and drives the bevel pinion J on the shaft K, whereby the motion of the driving-wheels is transmitted to the cutter's crank-shaft L. The bevel-wheel I and its pinion J are both inclosed and protected by the shield e, cast with the vibrating frame.

The shaft K has its bearings in the outer bar of the triangular frame F, which I prefer to make tubular for that purpose. The front or apex end of the triangular portion F of the vibrating frame is bifurcated, as shown at b b, so that it may afford a wide and stiff joint to unite said vibrating frame with the inverted frame or shoe M, and permit the central part of said joint to be open and unobstructed. Said joint is therefore formed with two bolts, d d, both in the axial line of said joint. In Fig. 20 the shoe M is shown bottom-side up. In Fig. 21 it is shown top-side up, and Fig. 22 in longitudinal side elevation.

The inverted shoe M is provided at its rear outer portion with a socket-plate, g, for the attachment of the hand-lever N, whereby the driver may, while on his seat, move said shoe M upon its transverse axis-pins d d, and said lever N moves over the surface of a rack, O, rigidly attached to the vibrating frame, so that a latch upon said lever may engage with said rack and hold said shoe M in any desired position.

At the front side of the shoe M there is a cylindrical projection, P, which is fitted to a corresponding hole in the lug Q, upon the forward end of the shoe R, to which the cutting apparatus S is attached, and thereby forms the front bearing of the longitudinal axis upon which said shoe and cutting apparatus may move. The rear bearing for said longitudinal axis is formed by a similar joint composed of two detachable lugs or standards, T and U, the one having a cylindrical horizontal projection fitted to a corresponding hole in the other, and adjusted with their axes coincident with the axis of P. The lugs T and U are bolted to the shoes M and R respectively, as shown, and completes the connection of the shoe R and cutting apparatus with the vibrating frame with longitudinal and transverse joints in the same horizontal plane, so that said cutting apparatus may move in any direction to conform to the undulation of the ground, or may be held and fixed in any desired position.

A cylindrical hole is made through the projection P and the corresponding projection of the lug T, and coincident with the axis of the same, and these holes form the bearings for the crank-shaft L, the crank of which is between the cutting apparatus. A short pitman, V, transmits motion from said crank to the cutter-bar. By this means the driving crank-shaft L rotates upon the same longitudinal axis upon which the cutting apparatus moves, and therefore the cutters will not be changed by changes in the position of the cutting apparatus.

The rear end of the crank-shaft L is bifurcated, as also the front end of the shaft K, and these bifurcated ends are set opposite to each other, and united by a gimbal or universal joint piece, W, which is adjusted so that the intersection of its cross-axis coincides with the intersection of the longitudinal and transverse axes of the shoes M and R.

By the means above described motion is transmitted from the main wheels A A to the cutters of the cutting apparatus S regularly and uniformly, without regard to the position of said cutting apparatus, and undisturbed by or during any changes of position of the same, so that while the machine is in motion the cutters may be raised at the outer or inner end, tilted or depressed, or raised up to a vertical position for transportation, without in any material degree changing the motion of the cutters.

The cutters preferred are the ordinary scalloped reciprocating kind, and they are kept in place in the apparatus by the usual stay or guide plates h.

A bell-crank hand-lever, X, is mounted upon the vibrating frame, and linked to the heel of the shoe on its outer side, so that the outer end of the cutting apparatus may be raised or lowered at the will of the driver. A segmental rack, Y, is also secured to said vibrating frame, and a hand-latch on said lever engages with said rack to hold the parts in position, as desired. I prefer to construct the said rack as a part of a bracket to be bolted fast to the vibrating frame, and provide said bracket with a pivotal stud, upon which to mount the lever X.

The draft-pole k is bolted, between parallel flanges, to the upper side of a triangular foot-plate, m, the rear end of which is jointed to two lugs, n n.

The seat-leg p also is bolted to the foot-plate m.

At the front end of the plate m there is a lug-joint, q, to which is jointed a latch, r, which is provided with a retracting-spring to keep it always in operative position.

There is also a lug, t, attached to the plate m farther back, and a bell-crank foot-lever, u, is jointed to said lug, and connected with the lug v on the vibrating frames by means of a link, w. The latch r is located directly in front of the lever u, and projects above it when they are in engagement, so that the driver can, by a single movement of his foot, displace the latch while his foot is resting upon said lever, so that, when so released, the lever may still be controlled by the foot, and the cutting apparatus prevented from falling violently upon the ground.

When it is desired to raise the cutting apparatus bodily from the ground the lever $u$ is depressed and engages with the latch $r$, whereby it is held as long as desired. If the lever X is also pulled backward as far as it will go the cutting apparatus will be raised up to a position nearly or quite vertical, and may be thrown over against the tongue.

It is advantageous to transmit all moving forces by the most direct routes possible, and I therefore have attached the double-tree $y$ to a slide, $z$, working on a guide-plate, $f$, bolted to to the under side of the tongue $k$, and I connect said slide directly to the front end of the shoe M, near to the pivot P, by means of a chain or link, $l$.

The plate $f$ is provided with a stop at its rear end, so that the slide $z$ cannot slip off at that end, and the link $l$ will not permit it to move forward far enough to pass off the forward end.

Having described my invention, what I claim as new is—

1. The inner shoe R and inverted shoe M, united by a longitudinal joint coincident with the axis of the crank-shaft, combined with said crank-shaft, whose crank is in line with the cutting apparatus, and united with the cutters by a pitman, substantially for the purpose set forth.

2. The inverted frame or shoe M, connected with the shoe R by a longitudinal joint coincident with the axis of the crank-shaft, and to the frame of the machine by a transverse joint in the same plane as the longitudinal joint, but in rear thereof, combined with the vibrating frame of the machine, substantially for the purpose set forth.

3. The cutting apparatus and inner shoe R, jointed to and connected with the frame of the machine by means of the inverted frame or shoe M, having the transverse and longitudinal joints, as described, combined with the short crank-shaft L, provided at its rear end with the universal or gimbal joint, as described, and for the purpose set forth.

4. The vibrating frame, as set forth, and bifurcated at its free end to form the transverse joint with the inverted shoe M, and permit the universal or gimbal joint W to be placed and to operate in the line of the axis of said transverse joint, as set forth.

5. In combination, a crank-shaft in two parts, united by a universal joint W, and with the crank upon the shoe, in line with the cutter-bar, and inverted shoe or frame M, secured to the cutting apparatus by a joint concentric with the axis of crank, and to the vibrating frame $f$ by a joint coincident with the transverse axis of the joint W, and a tripping-lever, N, and pivoted holding-rack O, whereby the points of the cutters will rise or fall in an arc whose center is in rear of the finger-bar, and without a backward or forward movement during said rise or fall.

6. The cutting apparatus and vibrating frame, severally connected with the inverted shoe M by transverse and longitudinal joints, which coincidently intersect the intersection of the cross-axes of the universal joint W, combined with the tilting lever N and folding lever X, whereby said cutting apparatus is tilted upon an axis coincident with the intersection of the cross-axes of the universal joint W, and folded upon the axis of the crank, and either of said movements effected without stopping the cutters.

7. The vibrating frame and foot-plate $m$, jointed together as shown and described, combined with the foot-lever $u$, and automatic latch $r$ directly in front of said foot-lever, as and for the purpose set forth.

WM. N. WHITELEY.

Witnesses:
 ALFRED L. CLARKE,
 T. F. CARTMELL.